(12) United States Patent
Jagadeesan et al.

(10) Patent No.: US 7,490,125 B1
(45) Date of Patent: Feb. 10, 2009

(54) MULTIMODAL SYSTEM AND METHOD

(75) Inventors: Ramanathan Jagadeesan, San Jose, CA (US); Wai-Yip Tung, San Francisco, CA (US); Bich Nguyen, Los Altos, CA (US); Alex Yiu-Man Chan, Mountain View, CA (US); David Lee, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 1148 days.

(21) Appl. No.: 10/458,778

(22) Filed: Jun. 10, 2003

(51) Int. Cl.
    *G06F 15/13* (2006.01)
(52) U.S. Cl. .............. 709/204; 709/203; 709/205; 709/226; 709/250; 725/97; 370/512; 379/265.06
(58) Field of Classification Search .......... 709/203, 709/226, 250, 204, 205; 725/97; 370/512; 379/265.06
    See application file for complete search history.

(56) References Cited

U.S. PATENT DOCUMENTS

| 6,748,436 | B1* | 6/2004 | Anand et al. .............. 709/226 |
| 6,801,618 | B2* | 10/2004 | Nygren et al. .......... 379/265.06 |
| 6,981,263 | B1* | 12/2005 | Zhang et al. .............. 719/310 |
| 2001/0037407 | A1* | 11/2001 | Dragulev et al. ........... 709/250 |
| 2003/0154240 | A1* | 8/2003 | Nygren et al. ............. 709/203 |

* cited by examiner

*Primary Examiner*—Jinsong Hu
(74) *Attorney, Agent, or Firm*—Stolowitz Ford Cowger LLP

(57) ABSTRACT

The invention relates to a system and method for coordinating multiple session multimodal interaction. The system and method includes a capability discovery module adapted to discover multimodal capability between at least one client and a multimodal device. The system and method includes an association module adapted to associate multiple independent sessions. The system and method includes a synchronization module adapted to synchronize at least one session with other sessions. And the system and method integrate the at least one client with other devices.

37 Claims, 10 Drawing Sheets

| CLIENT | CAPABILITY | ADDRESS |
|---|---|---|
| 1 | HTTP | HTTP ADDRESS |
| 1 | VoIP | VoIP ADDRESS |
| 2 | HTTP | HTTP ADDRESS |
| 2 | PSTN | PSTN ADDRESS |
| ---- | ---- | ---- |
| N | CAPABILITY | ADDRESS N |

Figure 3

MULTIMODAL SYSTEM AND METHOD

BACKGROUND OF THE INVENTION

1. Field of the Invention

The invention relates to a multimodal system and method and, more particularly, to a multiple sub-session multimodal system and method.

2. Description of the Related Art

As computing permeates society, the need to develop multimodal network systems increases. Multimodal systems involve a single user simultaneously interacting with several applications using a variety of input and output mechanisms. Multimodal systems allow for multiple interface modes including voice (e.g., via speech recognition engines), keypad, keyboard, mouse, and/or stylus input and text, video, graphics, audio (e.g., prompts), and voice (e.g., text to voice engines) output. Multimodal systems use each of these modes independently or concurrently.

A car's telematics unit might initiate a multimodal session with a location based server (LBS). In this context, a driver in a moving car uses voice to direct its telematics unit to acquire directions to a certain location from the LBS. The LBS responds in two ways: 1) the LBS relays voice instructions to guide the driver to the location; and 2) the LBS graphically displays a location map on the telematics unit's screen. Alternatively, a driver in a parked car interfaces with the LBS using a combination of button presses and voice input.

Another example of a multimodal session involves a user filling out a web airline reservation. The input modality here depends on the user's circumstance. For example, if the user is on foot, he might prefer to fill out the reservation form by speaking into his web enabled cellular phone. The cellular phone transmits the speech to a server that, in turn, converts the speech to fill out the form. Having reached the comfort of his office, the user might chose to complete the form using his keyboard and mouse as inputs while looking at a graphical representation of the form on his screen.

Yet another example of a multimodal session involves a user obtaining flight information through the web. The user might click on a flight icon on a device and say "Show me flights from San Francisco to Boston after 7 p.m. on Saturday." The browser then displays a web page with the corresponding flights, allowing the user to click on a specific flight and obtain further information.

Development in multimodal systems has focused on multimodal interaction (MI) on a single multimodal web session. MI extends the web interface to allow use of the multiple input and output modalities described earlier. Other solutions for MI use a multimodal markup language (MML) together with a hypertext transfer protocol (HTTP) session. A solution that uses a mixed mode MML for MI is U.S. patent application Ser. No. 10/293,529, filed Nov. 12, 2002, and assigned to the same assignee as the present application. The Speech Applications Language Tags (SALT) group and the World Wide Web Consortium (W3C) are each defining an MML for an MI user interface. The MI in each of these cases depends on the underlying MML.

Accordingly, a need remains for an improved multimodal system and method that is MML independent.

BRIEF DESCRIPTION OF THE DRAWINGS

The foregoing and other objects, features, and advantages of the invention will become more readily apparent from the detailed description of invention embodiments that reference the following drawings.

FIG. 3 is a diagram of a registration server.

DETAILED DESCRIPTION OF THE PREFERRED EMBODIMENT

The inventive multimodal system and method relies on multimodal sessions, each including different modality sub-sessions, e.g., voice telephony or HTTP sub-sessions. A session refers to a connection established between a server and a client and the series of interactions during the span of the connection. It follows that a sub-session refers to a connection established between different sub-clients and the server and the series of interactions during the span of the connection. Each sub-client typically communicates with the server in one modality, e.g., voice. The inventive system contrasts to prior multimodal systems that rely on an MML to control different modalities input to a single session. The inventive multimodal system and method described herein is not specific to any MML.

Figure 1:
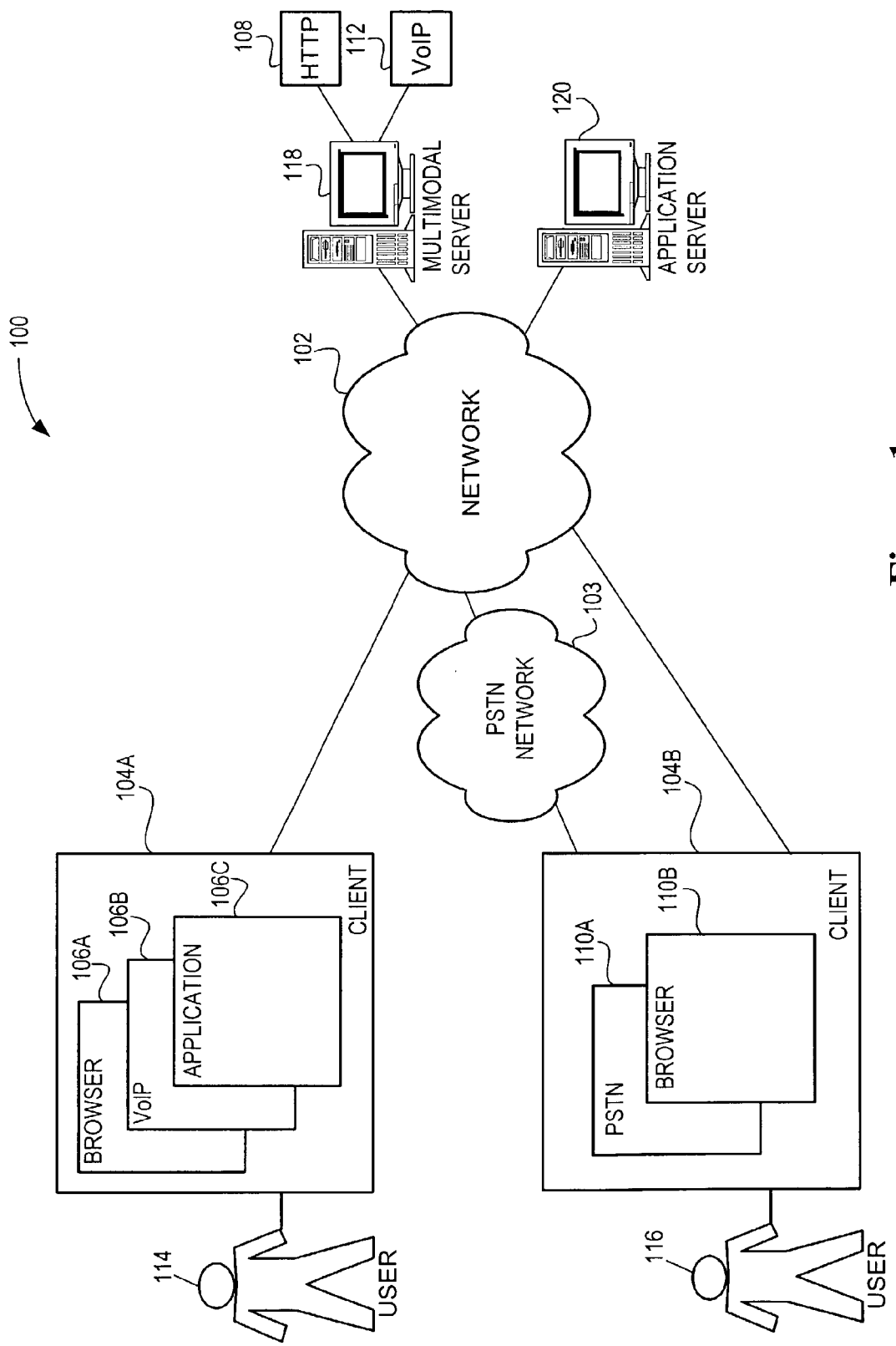
FIG. 1 is a block diagram of a multiple sub-session multimodal system.

Referring to FIG. 1, a multimodal system 100 includes clients 104A and 104B communicating with a multimodal server 118 and an application server 120 through a network 102. The network 102 might be a digital network such as an Internet Protocol (IP) network that digitally transports information packets from a destination to a source. In one embodiment, the network 102 carries the audio portion of the call via, e.g., Voice Over Internet Protocol (VoIP). Or the network 102 might be an analog network such as a telephone network, e.g., a Private Branch Exchange (PBX) or a public telephone network that transports analog signals from a destination to a source.

For simplicity, the multimodal system 100 shown in FIG. 1 includes only two, clients 104A and 104B, a single multimodal server 118, and single application server 120. A person of reasonable skill in the art should recognize that any number of clients and multimodal and application servers come within the scope of the present invention.

A user 114 accesses the network 102 via the client 104A. Similarly, a user 116 accesses the network 102 via the client 104B. The clients 104A and 104B interface with any kind of information appliance, respectively, including a telephone (digital or otherwise), computer (desktop, laptop, personal digital assistant, or otherwise), tablet (digital or otherwise), and the like. The clients 104A and 104B might simultaneously interface with two or more information appliances. The clients 104A and 104B will typically have both a voice capability and a graphics and text capability, to allow the clients 104A and 104B to benefit from the multimodal interaction. A person of reasonable skill in the art should understand that the appliances and corresponding clients might be integrated into a single device or might involved two or more distinct devices.

Each client, e.g., client 104A, includes a plurality of multimodal sub-clients, e.g., sub-clients 106A, 106B, and 106C. Each multimodal session consists of a plurality of sub-sessions established between the multimodal sub-clients and corresponding components running on the multimodal server 118. For example, a multimodal sub-session is established between the browser 106A and the HTTP component 108 of the multimodal server 118. Each multimodal sub-session might run independent of the others. Or each multimodal sub-session might run concurrently with others.

Each sub-session represents a particular type of voice, graphics, and/or text technology associated with an information appliance. For example, a sub-session involving the sub-client 106B might be a telephony application associated with a digital telephone (not shown), e.g., using voice over Internet protocol (VoIP) technology. The VoIP sub-session allows the user 114 to use a global network 102 e.g., the Internet, as the transmission medium to make phone calls. The VoIP sub-session might be either a stand-alone product or come bundled with popular web browsers.

For another example, a sub-session involving the sub-client 106A might be a browser associated with a personal computer (not shown). The browser 106A provides a graphical user interface (GUI) to the user 114. The browser typically renders hyper text mark up language (HTML) and uses HTTP to communicate with the server 118. HTTP is the underlying protocol used by the World Wide Web. HTTP defines how messages are formatted and transmitted and the actions servers (e.g., multimodal and application servers 118 and 120, respectively) and browsers should take responsive to various commands. For example, when the user 114 enters a uniform resource locator in his computer's browser, the browser 106A sends a HTTP command to the HTTP component 108 directing it to fetch and transmit the requested web page. The HTTP component 108 responds by fetching and transmitting the browser's requested web page. A person of reasonable skill in the art should recognize that the browser 106A includes any kind of GUI using any kind of rendering and communication means.

For yet another example, a sub-session involving the sub-client 110A might be a public switched telephone network (PSTN) sub-session associated with a telephone. PSTN refers to the international telephone system based on copper wires carrying analog voice data. Newer telephone networks are based on digital technologies, such as integrated services digital network (ISDN). A person of reasonable skill in the art should recognize that the invention includes analog and digital telephone systems including the PSTN and ISDN. The PSTN sub-client 110A communicates with the network 102 through a PSTN network 103.

The PSTN sub-session involving the sub-client 110A might use IVR technology. In IVR, a user employs a touchtone telephone to acquire information from or enter data into a database running on a remote server, e.g., server 120. The user 114's interaction with the database is predetermined by the access allowed by the IVR component (not shown). For example, banks and credit card companies use UVR so that their customers can receive up-to-date account information instantly and easily without having to speak directly to a bank employee.

The multimodal server 118 coordinates and otherwise controls multimodal communications (sub-sessions) between the sub-clients, e.g., 106A and 106B, and itself. The application server 120 provides content to the clients 104A and 104B and, more particularly, to application sub-client 106C. Although shown in FIG. 1 as two distinct devices, the application server 120 and the multimodal server 118 might comprise a single device.

The multimodal server 118 might include or gather content from the application server 120. The content is provided in any of a variety of well-known formats.

Figure 2:
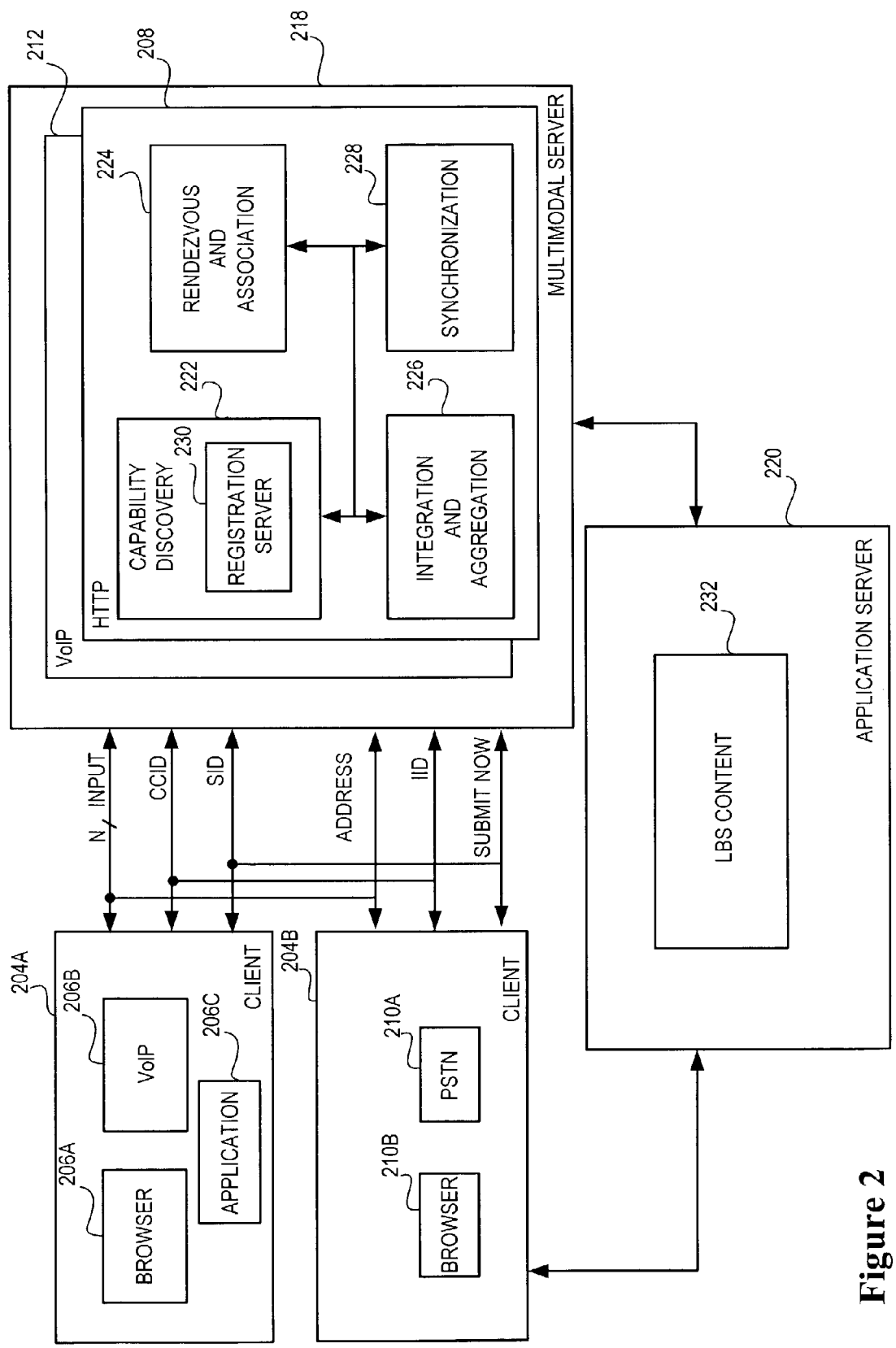
FIG. 2 is a block diagram of a multiple sub-session multimodal system.

FIG. 2 is a simplified block diagram of the multimodal system shown in FIG. 1. Referring to FIG. 2, a multimodal system 200 includes a client 204A with a browser sub-client 206A, a VoIP sub-client 206B, and an application sub-client 206C. Similarly, a client 204B includes a browser sub-client 210B and a PSTN sub-client 210A.

Multimodal sub-sessions are established between the sub-clients 206A-C and 210A-B and the multimodal server 218 via a network 102 and a PSTN network 103 (FIG. 1). The multimodal server 218 includes a capability discovery module 222 adapted to discover multimodal capability in at least one of the sub-clients 206A, 206B, and 206C and 210A and 210B and the server 218. A rendezvous and association module 224 is adapted to associate multiple independent sub-sessions involving sub-clients, e.g., 206A and 206B, that are part of a single multimodal session. An integration and aggregation module 226 is adapted to integrate at least one sub-session involving a sub-client, e.g., sub-client 206C, with the application server 220 and the multimodal server 218. A synchronization module 228 is adapted to synchronize multiple sub-sessions involving corresponding multiple sub-clients.

The capability discovery module 222, the rendezvous and association module 224, the integration and aggregation module 226, and the synchronization module 228 might be implemented in hardware, software, or a combination of both.

Figure 4:
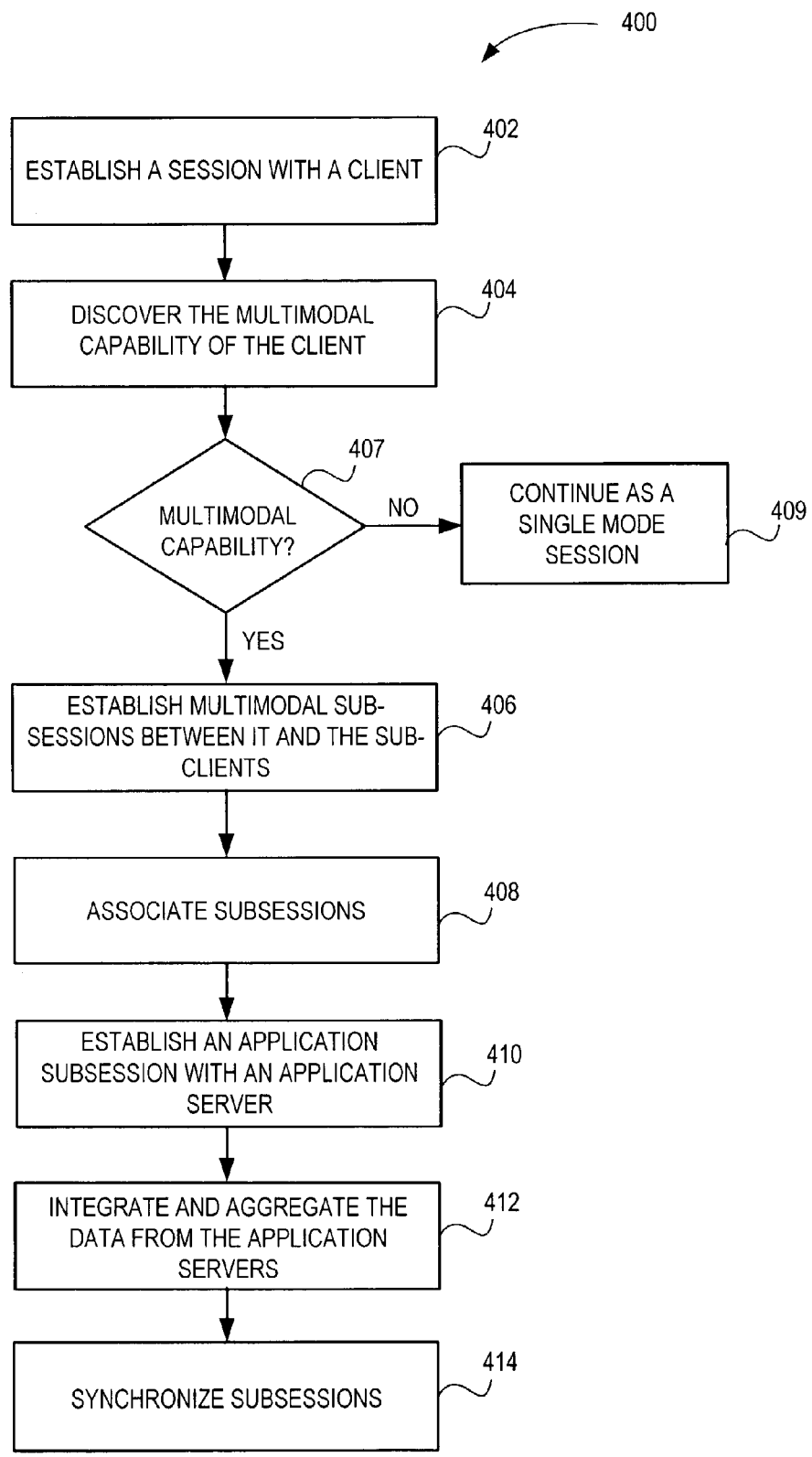
FIG. 4 is flowchart of a multiple sub-session multimodal method.

FIG. 4 is an example flowchart of a multiple sub-session MI method 400 of the present invention. The method 400 might be practiced by the server 118 or the clients 104A-B. Referring to FIGS. 1 and 4, at box 402, the multimodal server 118 establishes a session with at least one client, e.g., client 104A. Once the server 118 establishes a session, the server 118 needs to discover whether the client 104A has other capabilities (box 404). For example, if the initially set up session is as an HTTP session with the browser sub-client 106A, the server 118 needs to discover that the VoIP sub-client 106B has voice capabilities and that the sub-session set up with it will be a voice session. If the server does not discover multimodal capability (box 407), the session continues as a single mode session (box 409). If, however, the server discovers multimodal capability at 407, the server establishes multimodal sub sessions between it and the sub-clients (box 406). At box 408, the server 118 associates multiple independent sub-sessions with the sub-clients 106A-C to a single multimodal session with client 104A. The server 118 integrates and/or aggregates an application server 120 by establishing an application sub-session with an application server (box 410). One example is the server 118 establishing a back end communication channel with the application server 120 responsive to a session identifier received from the application server 120. At box 412, the server 118 integrates and aggregates data from the application server(s). At box 414, the server 118 synchronizes the sub-sessions with the sub-clients 106A-C. This synchronization might involve the server 118 providing an interaction identifier to communications between it and the sub-clients 106A-C and discarding subsequently received stale input responsive to the interaction identifier. The server's use of the interaction identifier is explained in more detail below.

Figure 5:
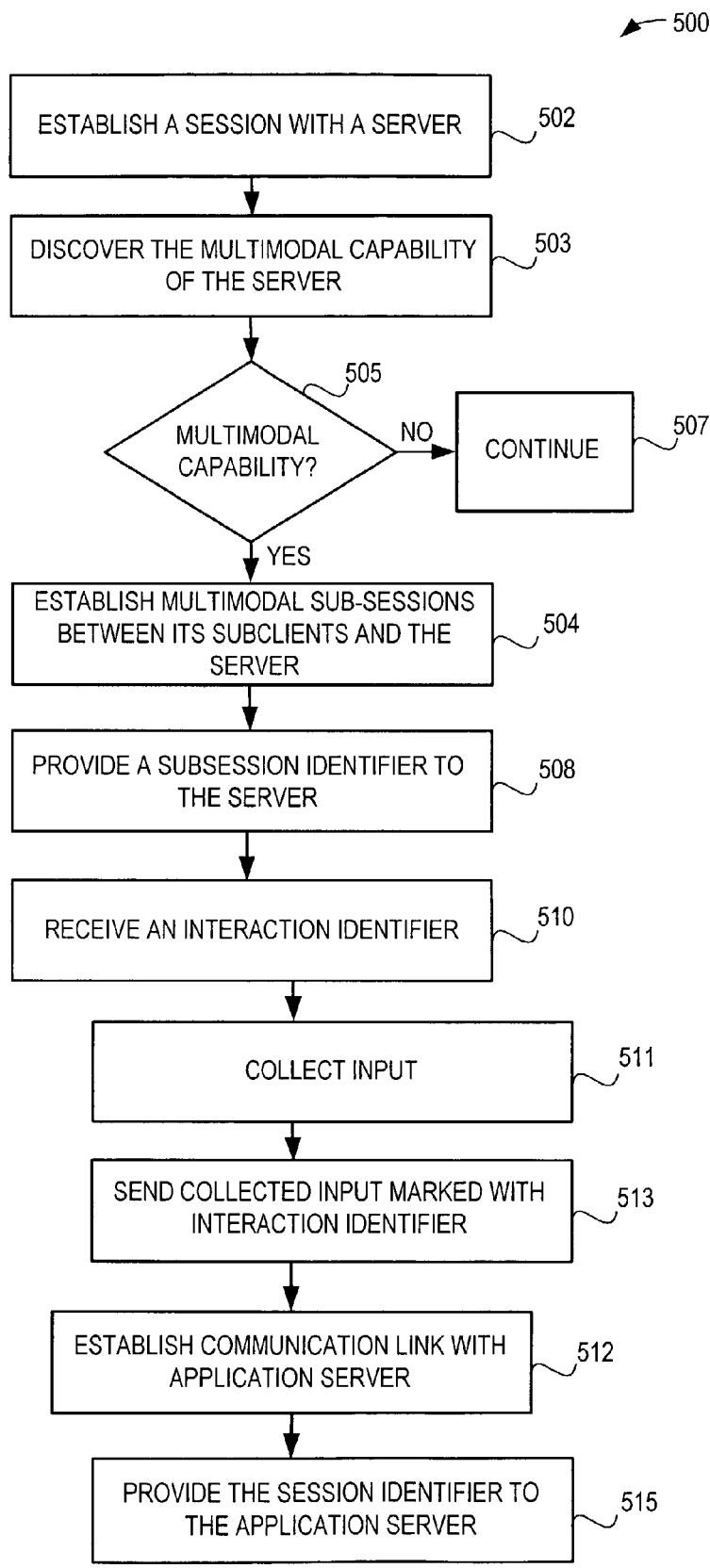
FIG. 5 is flowchart of a multiple sub-session multimodal method.

FIG. 5 is an example flowchart of a multiple sub-session MI method 500 of the present invention. The method 500 might be practiced by the server 118 or the clients 104A-B. For simplicity, we mention a single client 104A in the following description. Referring to FIGS. 1 and 5, at box 502, the client 104A establishes a session with the server 118. The client 104A discovers the multimodal capability of the server (box 503). If multimodal capability does not exist (box 505), the session continues as a single mode session (box 507). If multimodal capability exists (box 505), the client establishes a plurality of sub-sessions with each of the sub-clients 106A-C included in the client 104A (box 504). For example, if the initially set up sub-session is as an HTTP sub-session between the browser sub-client 106A and the server 118, the client 104A discovers that the server 118 has voice capabilities allowing it to establish a voice sub-session between the VoIP sub-client 106B and the server 118. At box 508, the client 104A provides a session identifier to the server 118. The server 118, in turn, associates multiple independent sub-sessions with the sub-clients 106A-C to a single multimodal session with client 104A. At box 510, the client 104A receives an interaction identifier from the server 118 that allows it to synchronize the sub-sessions with the sub-clients 106A-C. The client 104A collects input (box 511) and sends the collected input marked with the interaction identifier (box 513). By doing so, the server 118 is capable of identifying and discarding stale input as we describe in more detail below. At box 512, the client 104A and, more particularly, the application sub-client 106C establishes a communication link with the application server 120. The sub-client 106C provides the application server with the session identifier at box 515. The session identifier allows the application server 120 to establish a back end communication channel with the server 118.

Multiple sub-session MI presents several challenges as evidenced by the methods 400 and 500 we describe above. The first involves multimodal capability discovery. When a multimodal sub-client initiates a sub-session, the multimodal server 118 and/or client, e.g., client 104A, must discover that the other is capable of the same multiple sub-session MI. The capability discovery module 222 answers this challenge.

In one embodiment, the capability discovery module 222 includes a registration server 230. FIG. 3 is an embodiment of the registration server 230 shown in FIG. 2. Referring to FIGS. 2 and 3, the client 206A registers with the registration server 330 specifying its capability and/or complementary sub-client address. In one embodiment, the registration occurs before the MI begins. The registration server 330 stores the client's identification in column 332, the client's multimodal capabilities in column 334, and the associated addresses in column 336. When the server 218 initiates a session with a client, it queries the registration server 230 with the client's identification and obtains the corresponding client's capabilities and complementary addresses. For example, assume the server 218 identifies client 204A with the number 1. Using the registration server 230, the server 218 identifies that client 204A with an identification of 1 has HTTP and VoIP capabilities through its sub-clients 206A and 206B, respectively. The server 218 can also identify the addresses associated with each of the browser and VoIP sub-clients using information contained in the registration server 230.

Alternatively, the capability discovery module 222 uses a client/capability identification (CCID) to discover multimodal capabilities. For example, if the session starts out as a HTTP sub-session between the server 218 and the browser sub-client 206A, the server 218 and/or the client 204A needs to discover that the other has other capabilities, e.g., voice. The CCID identifies the voice capability. In one embodiment, the CCID is included with the HTTP request made by the browser sub-client 206A as a composite capabilities/preference profiles (CCPP) extension. Alternatively, if the session starts out as a VoIP sub-session between the server 218 and the VoIP sub-client 206B, voice session protocol extensions, e.g., session initiated protocol (SIP) or SCCP, can be used to convey the HTTP capability. Also alternatively, if the session starts out as a PSTN call between the server 218 and the PSTN sub-client 210A, in-band signaling, e.g., DTMF tones, can be used to convey other capabilities.

Figure 6:
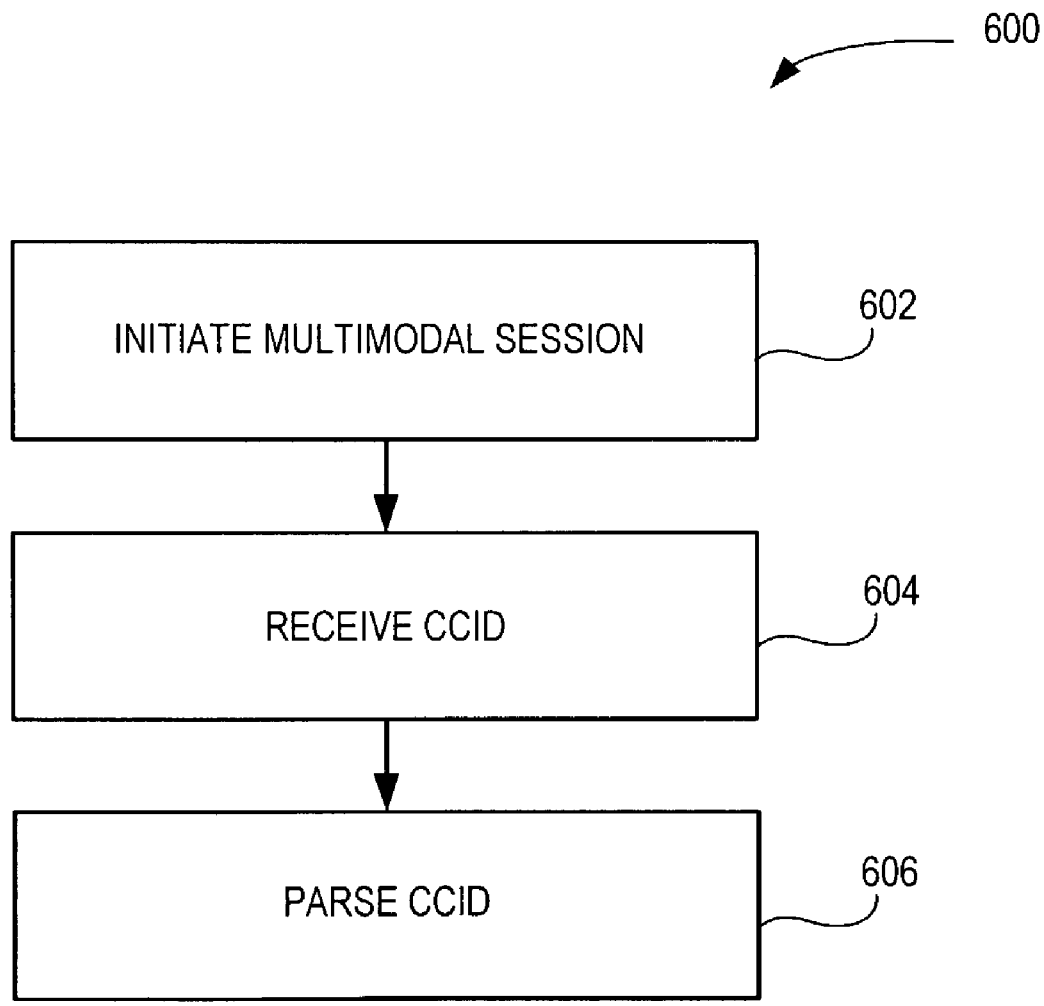
FIG. 6 is a flowchart of a capability discovery method.

FIG. 6 is an example flowchart of a capability discovery method 600. Referring to FIGS. 2 and 6, a client 204A and/or a server 218 initiates a session (box 602). At box 604, server 218 receives a CCID sent by the sub-client. If the client 204A initiates an HTTP sub-session between its sub-client 206A and the server 218, for example, the CCID is embedded in the HTTP request as a CCPP extension. The CCID indicates to the server that the client 204A additionally supports voice sub-sessions through its VoIP sub-client 206B. At box 606, the server 218 parses the HTTP request for the CCPP extensions indicative of the voice capability. In this context, the server 218 need not necessarily be specifically informed of the HTTP capability since the server 218 infers it from the initial HTTP sub-session with the browser sub-client 206A. The HTTP request might additionally provide the complementary addresses in a similar fashion as we describe for the CCID transmission.

Similarly, and as another example, if the client 204A initiates a VoIP sub-session between its sub-client 206B and the server 218, the CCID is embedded in the VoIP request as a SIP or SCCP extension. The CCID indicates to the server that the client 204A additionally supports HTTP sub-sessions through its browser sub-client 206A. At box 606, the server 218 parses the VoIP request for the SIP or SCCP extensions indicative of the HTTP capability. In this context, the server 218 need not necessarily be specifically informed of the VoIP capability since the server 218 infers it from the initial VoIP sub-session with the VoIP sub-client 206B. The VoIP request might additionally provide the complementary addresses in a similar fashion as we describe for the CCID transmission.

As yet another example, if the client 204B initiates a PSTN call between its sub-client 210A and the server 218, the CCID is embedded using in-band signaling, e.g., dual tone multi-frequency (DTMF) signaling through the PSTN network 103. The DTMF signaling informs the server 218 of the client 204B's other multimodal capabilities e.g., the browser sub-client 210B. The server 218 need not necessarily be specifically informed of the PSTN capability since the server 218 infers it from the initial PSTN call. Alternatively, other multimodal capabilities might be obtained directly from a user through IVR.

A second challenge in multiple sub-session MI is rendezvous and association. In multiple sub-session MI, multiple sub-sessions might start out independently. For example, the VoIP and browser sub-clients might separately and independently initiate corresponding VoIP and HTTP sub-sessions that handle the voice and graphical user interface (GUI) facets, respectively, of the MI. The rendezvous and association module 224 must associate the VoIP and HTTP sub-sessions to a single multimodal session for successful MI.

The rendezvous and association module 224 uses a session identifier (SID) unique to each session to associate sub-clients in the identified session. The browser sub-client 206A might provide the SID to the rendezvous module 224 through the HTTP request to set up the HTTP sub-session. In one embodiment, the SID is included as a CCPP extension.

The VoIP sub-client 206B might provide the SID as part of the session protocol exchange, e.g., as user data. The VoIP sub-client 206B might alternatively provide the SID to the rendezvous module 224 as telephony or VoIP parameters. The PSTN sub-client 210A provides the SID to the module 224 as PSTN parameters, e.g., caller-id/ANI, DNI, or other caller entered digits through the PSTN network 103.

Figure 7:
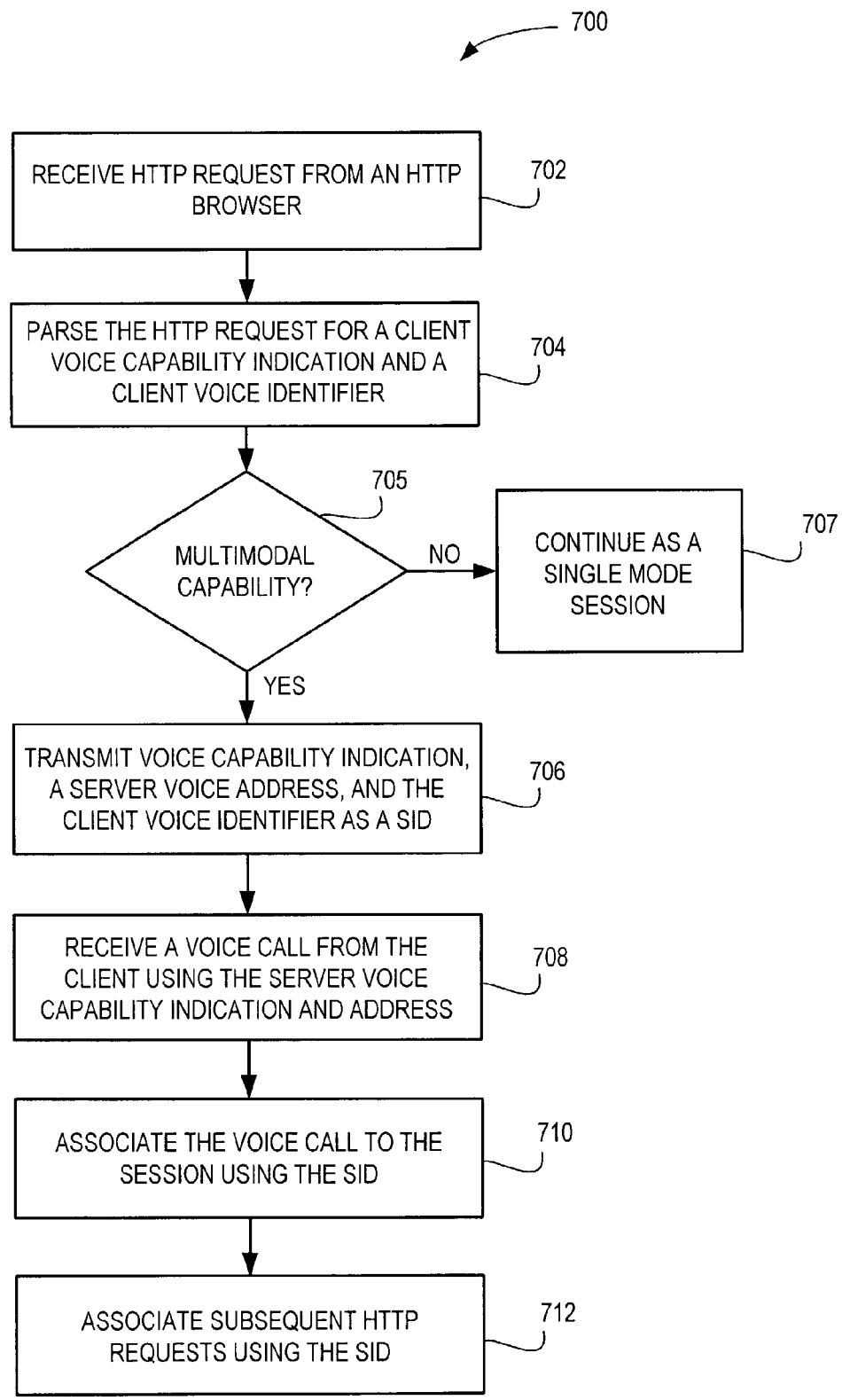
FIG. 7 is a flowchart of a capability discovery method.

One embodiment of the rendezvous and association module 224 operates as shown in FIG. 7. The server 218 might practice the method 700. Referring to FIGS. 2 and 7, a server 218 receives an HTTP request from the browser 206A to initiate an HTTP sub-session (box 702). The HTTP request includes a VoIP capability indication CCID and a voice sub-client identifier SID, e.g., caller-id. At box 704, the server 218 parses the HTTP request for the CCID and SID.

At box 705, the server 218 determines whether multimodal capability exists. If the server 218 finds no multimodal capability, the session continues as a single mode session at 707. If the server 218 determines multimodal capability exists, the server 218 (module 224) responds by including its VoIP capability CCID, a server VoIP address (e.g., domain name), and the sub-session's SID (box 706). At box 708, the server 218 receives a voice call from the VoIP sub-client 206B using the server's VoIP CCID and address. At box 710, the server 218 (module 224) uses the (derived) SID to associate the sub-sessions involving the VoIP sub-client 206B and the HTTP sub-client 206A. At box 712, the server 218 (module 224) uses the SID to associate subsequent sub-clients to the session.

Figure 8:
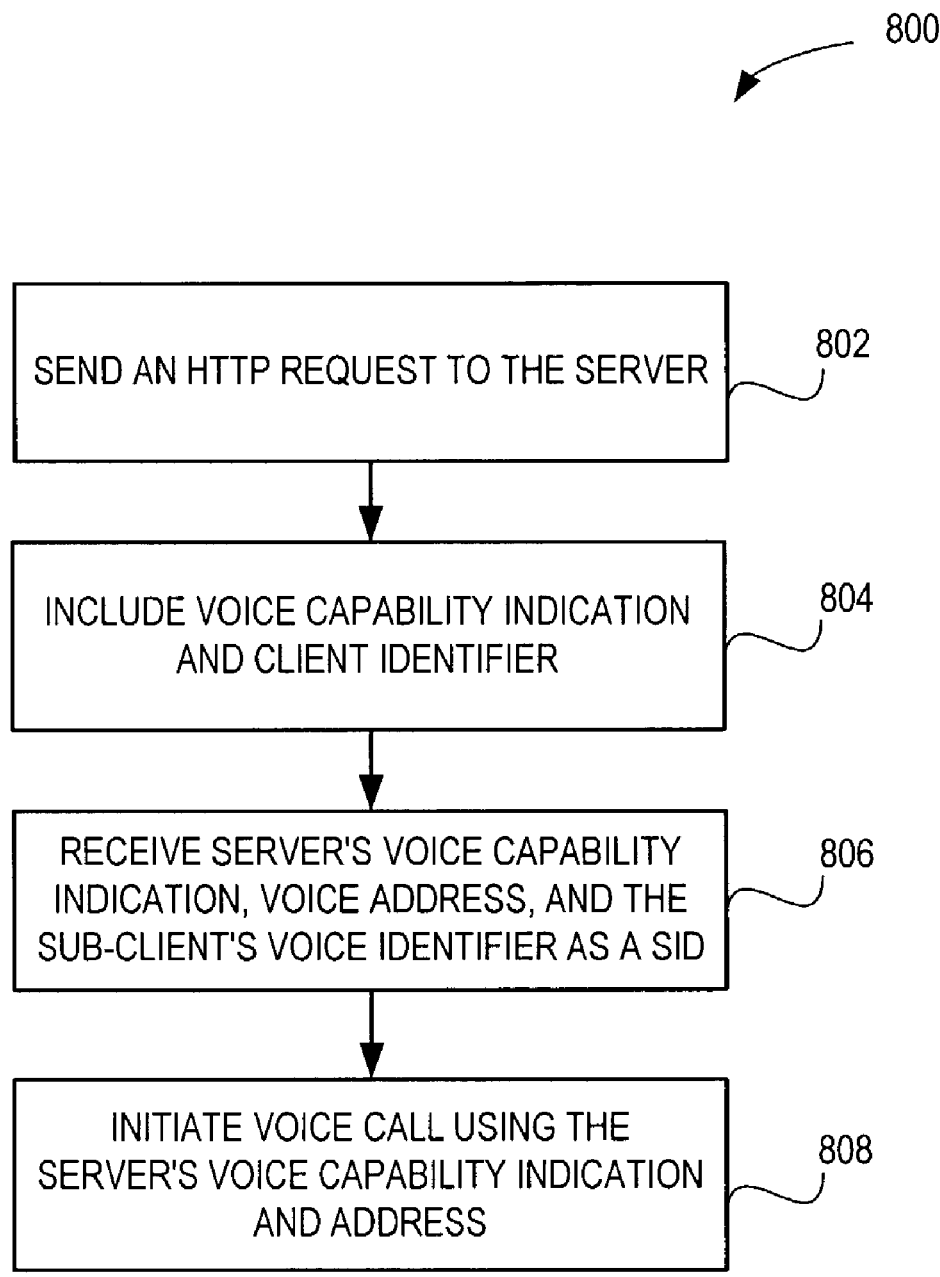
FIG. 8 is a flowchart of a rendezvous and association method.

Another embodiment of the rendezvous and associated module 224 operates as shown in FIG. 8. The client 204A might practice the method 800. Referring to FIGS. 2 and 8, the sub-client 206A sends an HTTP request to the server 218 to initiate an HTTP sub-session (box 802). The sub-client 206A includes a VoIP capability indication CCID and a voice sub-client identifier SID, e.g., caller-id, in the HTTP request (box 804). The sub-client 206A receives from the server 218, the server's VoIP CCID, voice address, and the sub-session's SID. The sub-client 206B initiates a voice call to the server 218 using the server's voice capability indication CCID and voice address (box 808).

A third challenge in multiple sub-session MI is input synchronization from different sub-clients. In a multiple uncoordinated input environment, incoming data arrives from any of the sub-clients. The input might arrive in an unspecified time or order. And the input might contain conflicting requests. The synchronization module 228 synchronizes the various inputs and identifies stale inputs. Stale inputs might occur as a result of network signal delay or network synchronization problems (out of sync). The synchronization module 228 addresses synchronization challenges. The synchronization module 228 associates an increasing interaction identification (IID) to each input received by the server 218. The synchronization module 228 sends the current IID to every sub-client with which it has established a sub-session. When a sub-client sends an input, it sends it together with the associated IID in much the same manner as discussed previously for other parameters. For example, the browser sub-client 206A might include the IID in the HTTP request as a CCPP extension. For a same IID, the synchronization module 228 accepts a single input. The synchronization module 228 discards subsequent inputs with the same IID as stale or old. After the synchronization module 228 processes an input, it increments the IID and resends it to the sub-clients. By doing so, the synchronization module 228 synchronizes all sub-sessions with all sub-clients with the current, updated, IID.

Figure 9:
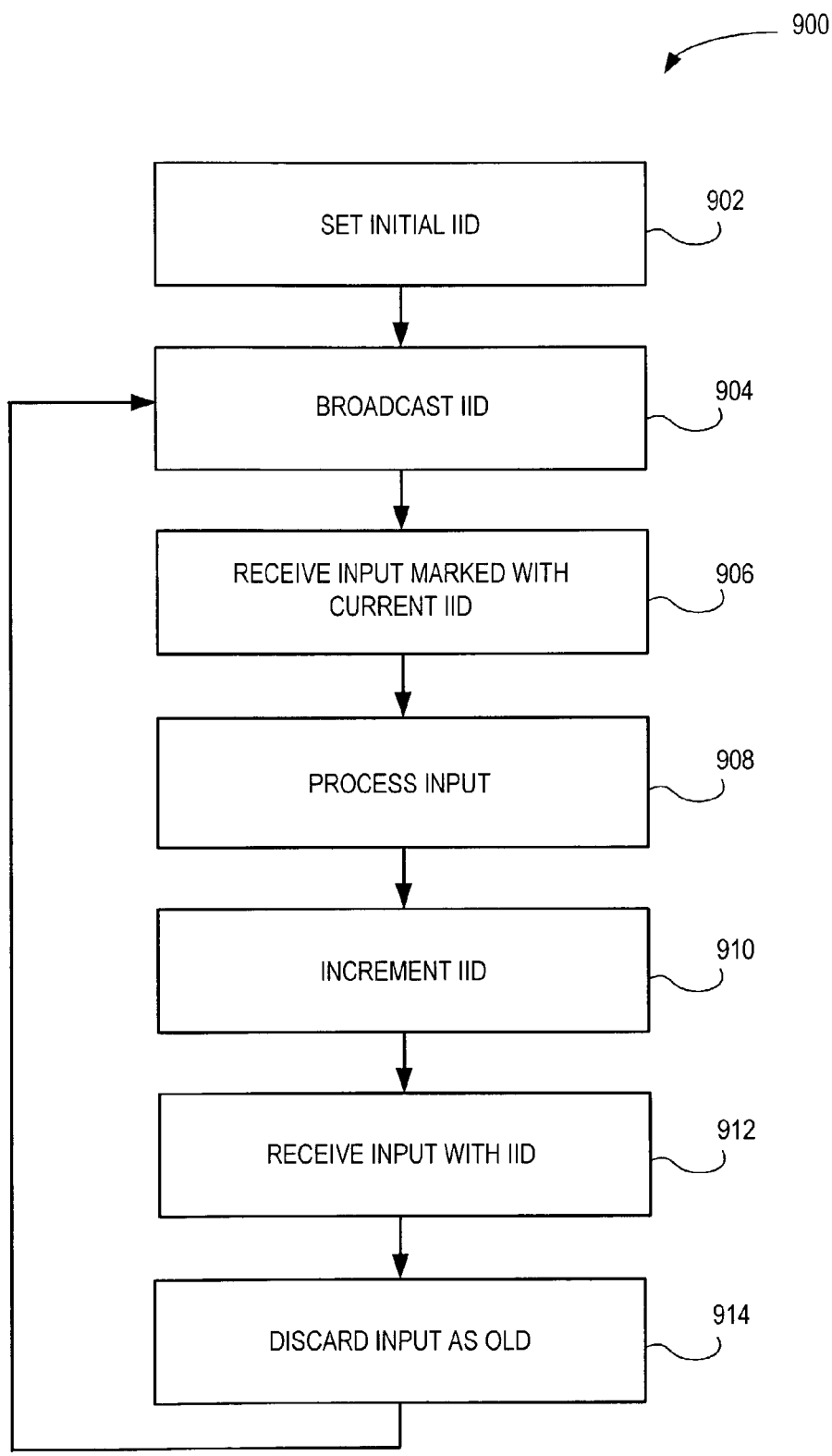
FIG. 9 is a flowchart of a synchronization method.

One embodiment of the synchronization module 228 operates as shown in method 900 of FIG. 9. The server 218 might perform the method 900. Referring to FIGS. 2 and 9, the server 218 (synchronization module 228) sets an initial IID to 1 (box 902). At box 904, the server 218 broadcasts or sends the current IID to sub-clients 206A and 210A. At box 906, the server 218 receives input from the sub-client 206A together with the IID of 1. The server 218 processes the input from sub-client 206A (box 908) and increments the IID to 2 (box 910). The server 218 receives input from the sub-client 210A marked with an IID of 1 (box 912). At box 914, the server 218 (module 228) discards this input as stale since current IID is 2. The server 218 re-broadcasts the incremented ID to the sub-clients 206A and 210A (box 904).

In multiple coordinated input environments, different sub-clients provide partial information for the complete input. The synchronization module 228 here combines the partial information to obtain the complete meaning. For example, a fast food order system comprises a touch screen and a voice system. A user selects a burger using the touch screen and then says into a speaker: "I want fries!" The server 218 requires input from both the touch screen and the voice system to complete the message: "I want a burger and fries."

The synchronization module 228 in this environment uses a Submit Now command to instruct the various sub-clients to provide their partial context so that it can complete the entire message. The Submit Now command might be alternatively transmitted from a sub-client submitting partial context to another, in sub-client-to-sub-client communication. The former methodology has the advantage of not requiring the sub-clients to directly communicate with or have knowledge of each other. In the example provided above, the user selecting a burger with the touch screen actives the voice system to provide its input ("I want fries!") by transmitting the Submit Now command. With the two inputs, the server 218 can complete the message in a timely fashion.

Figure 10:
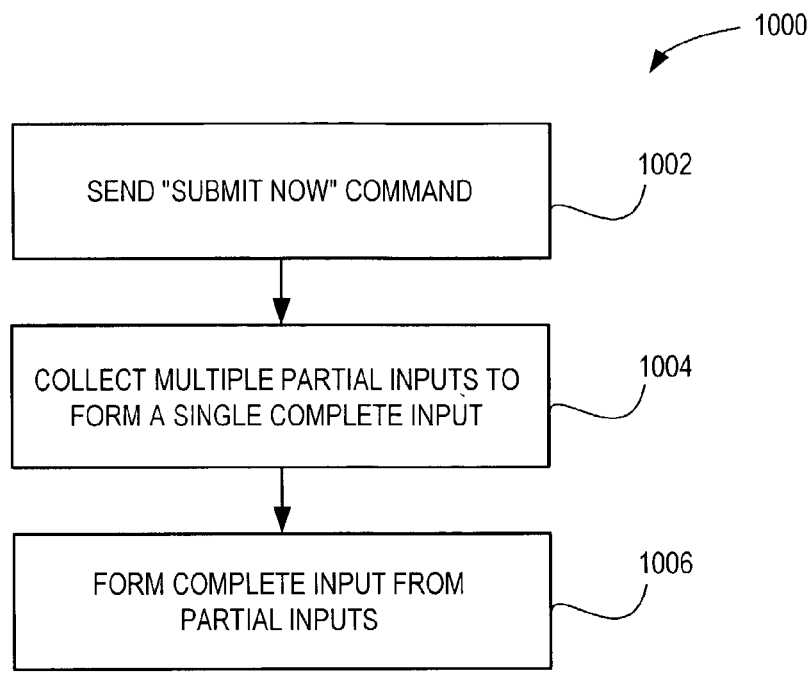
FIG. 10 is a flowchart of a synchronization method.

In this context, one embodiment of the synchronization module 228 operates as shown in method 1000 of FIG. 10. The server 218 might perform the method 1000. Referring to FIGS. 2 and 10, the server 218 (module 228) sends a Submit Now command to all sub-clients involved in the MI (box 1002). At box 1004, the server 218 collects multiple partial inputs from the sub-clients involved in the multimodal session. The server 218 forms a single complete input from the partial inputs (box 1006).

A last challenge in multiple sub-session MI is integration and aggregation of dynamic application data. Automatic application specific data session might occur between an application client 206C and an application server 218. Such application data, if integrated with a multimodal session, can be used to provide enhanced services. An integration and aggregation module 226 serves to integrate and aggregate multimodal content from multiple content servers.

Referring to FIG. 2, the client 204A might include an application specific sub-client 206C that uses content in an application server 220. For example, the sub-client 206C uses LBS content 232 streamed from the application server 220. The sub-client 206C conveys the SID to the application server 220 using, e.g., an application protocol.

Figure 11:
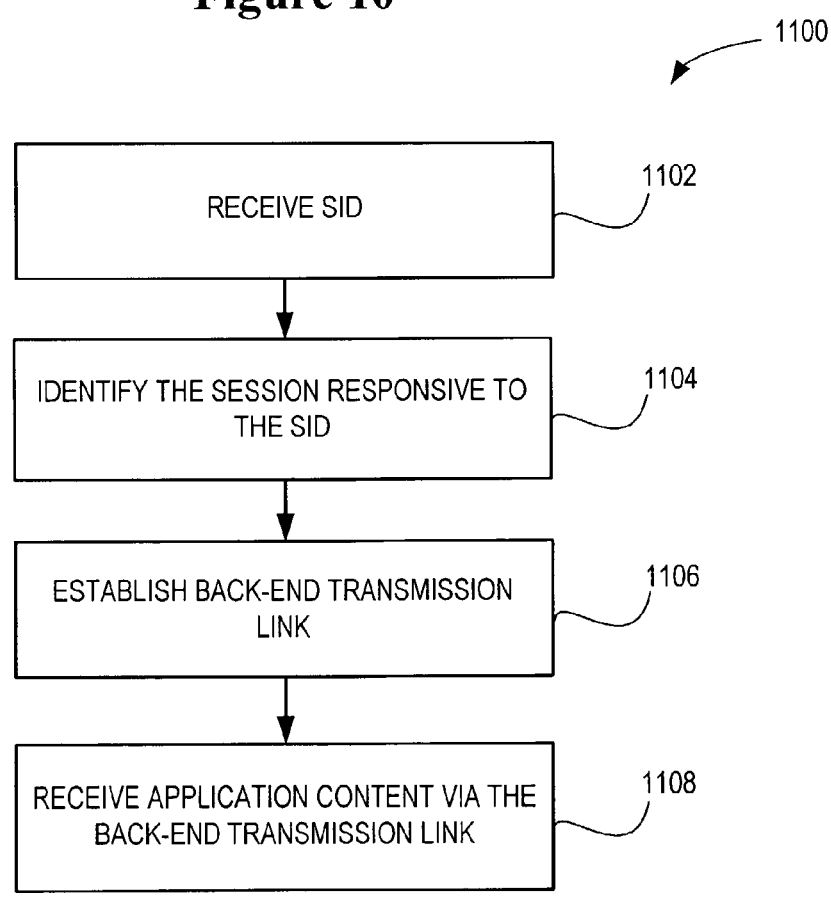
FIG. 11 is a flowchart of an integration method.

FIG. 11 is a flowchart of an example integration and aggregation method 100. The server 218 might perform the method 1100. Referring to FIGS. 2 and 11, the multimodal and application servers 218 and 220, respectively, receive a same SID (box 1102). At box 1004, the multimodal server 218 identifies the session responsive to the SID. At box 1106, the multimodal server 218 establishes a back end transmission link with the application server 220 using the SID. At box 1108, the multimodal server 218 receives application content from the application server 220 via the back end transmission link.

Having illustrated and described the principles of our invention, it should be readily apparent to those skilled in the art that the invention can be modified in arrangement and detail without departing from such principles. I claim all modifications coming within the spirit and scope of the accompanying claims.

We claim:

1. A multimodal device to coordinate a plurality of multimodal sessions associated with a corresponding plurality of clients, the multimodal device comprising:
   a capability module configured to discover multimodal capability between at least one client and the device where the device or the at least one client, or combinations thereof, are configured to initiate a first sub-session corresponding to the discovered multimodal capability;
   a registration server configured to register the discovered multimodal capability;
   an initiation module configured to initiate a second sub-session responsive to the discovered multimodal capability;
   an integration module configured to integrate the at least one client with an application server running an application;
   an association module configured to associate the first and second sub-sessions via, at least in part, a session identifier provided from the at least one client where the session identifier identifies independent sub-sessions of at least one multimodal session; and
   a synchronization module adapted to synchronize the the first and second sub-sessions with the independent sub-sessions of the at least one multimodal session.

2. The multimodal device of claim 1
   wherein the at least one client is a browser sub-client; and
   wherein the capability module is configured to receive an HTTP request made by the browser sub-client, the HTTP request being adapted to indicate a voice capability.

3. The multimodal device of claim 1
   wherein the at least one client is a VoIP sub-client; and
   wherein the capability module is configured to receive a VoIP request made by the VoIP sub-client, the VoIP request being configured to indicate an HTTP capability.

4. The multimodal device of claim 1
   wherein the at least one client is a PSTN sub-client; and
   wherein the capability module is configured to receive a PSTN request made by the PSTN sub-client, the PSTN request being configured to indicate an HTTP capability.

5. The multimodal device of claim 1 wherein the capability module is configured to receive an interactive voice response to obtain an address for the at least one client.

6. The multimodal device of claim 1 wherein the registrations server is further adapted to register:
   a client identification;
   at least one multimodal capability associated with the client identification; and
   an address for the at least one multimodal capability.

7. The multimodal device of claim 1 wherein the association module is configured to associate the multiple independent sub-sessions to a single one of the multimodal sessions.

8. The multimodal device of claim 1 wherein the synchronization module is adapted to synchronize multiple uncoordinated inputs from the plurality of clients.

9. The multimodal device of claim 8
   wherein the synchronization module is configured to associate each input with a corresponding interaction identification, send a current interaction identification to each input, accept a single input for each interaction identification, discard subsequently received inputs having a same interaction identification, and increment the interaction identification.

10. The multimodal device of claim 1
    wherein the synchronization module is configured to synchronize multiple coordinated inputs from the plurality of clients, two or more of the coordinated inputs each providing partial information for a complete input.

11. The multimodal device of claim 10
    wherein the synchronization module is configured to send a submit now command to each input providing partial information.

12. The multimodal device of claim 1 wherein the integration module is configured to communicate with the application server responsive to the session identifier.

13. A multimodal server configured to manage a multimodal session, comprising:
    a capability means for determining multimodal capability in at least one client associated with a first multimodal sub-session;
    an initiating means for initiating a second multimodal sub-session corresponding to the multimodal capability determined in association with the first multimodal sub-session;
    an association means for associating multiple sub-sessions from the at least one client;
    a synchronization means for synchronizing the multiple sub-sessions from the at least one client;
    registration means for registering the multimodal capability associated with the at least one client at a registration server; and
    an integration means for integrating the at least one client with an application server.

14. The multimodal server of claim 13
    wherein the capability means receives an HTTP request made by a browser sub-client, the HTTP request being configured to indicate a voice capability; and
    wherein the association means associates the multiple sessions from the at least one client responsive to a session identifier included in the HTTP request.

15. The multimodal server of claim 13
    wherein the capability means receives a VoIP request made by a VoIP sub-client, the VoIP request being configured to indicate an HTTP capability; and
    wherein the association means associates the multiple sessions from the at least one client responsive to a session identifier included in the VoIP request.

16. The multimodal server of claim 13
    wherein the capability means receives a PSTN call made by a PSTN sub-client, the PSTN request being configured to indicate an HTTP capability; and
    wherein the association means associates the multiple sessions from the at least one client responsive to a session identifier included in the PSTN call.

17. The multimodal server of claim 13
    wherein the registration means comprises:
    a client identification means; and
    an address means.

18. The multimodal server of claim 13
    wherein the synchronization means is configured to send a current interaction identification to each client, accept a single input for each interaction identification, discards subsequently received inputs having a same interaction identification, and increments the interaction identification.

19. The multimodal server of claim 13
wherein the synchronization means is configured to synchronize multiple coordinated inputs from the multiple sessions, two or more of the coordinated inputs each providing partial information for a complete input.

20. The multimodal system of claim 13 wherein the integration means is configured to communicate with the application server responsive to a session identifier.

21. A method for coordinating a multimodal session, comprising:
discovering multimodal capability in at least one of a plurality of clients associated with a first multimodal sub-session of the multimodal session;
registering the multimodal capability in a registration server;
initiating a second sub-session of the multimodal session corresponding to the multimodal capability;
associating multiple sub-sessions from the at least one client via, at least in part, a session identifier provided from the at least one client;
integrating the at least one of the plurality of clients with an application server running an application; and
synchronizing the first and second multimodal sub-sessions with other sub-sessions of the multimodal session.

22. The method of claim 21 comprising establishing a communication link between the at least one client and the application server.

23. The method of claim 22 wherein the establishing occurs responsive to the session identifier.

24. The method of claim 21
wherein the discovering comprises receiving an HTTP request made by a browser sub-client, the HTTP request being configured to indicate a voice capability, and the HTTP request including the session identifier; and
wherein the associating occurs responsive to the session identifier.

25. The method of claim 21
wherein the discovering comprises receiving a VoIP request made by a VoIP sub-client, the VoIP request being configured to indicate an HTTP capability, and the VoIP request including the session identifier; and
wherein the associating occurs responsive to the session identifier.

26. The method of claim 21
wherein the discovering comprises receiving a PSTN request made by a PSTN sub-client, the PSTN request being configured to indicate an HTTP capability, and the PSTN request including the session identifier; and
wherein the associating occurs responsive to the session identifier.

27. The method of claim 21
wherein the registering comprises registering an identification of the at least one of the plurality of clients and address for each multimodal capability associated with the identification.

28. The method of claim 21 wherein the synchronizing comprises:
broadcasting a current interaction identification;
accepting a single input for each interaction identification;
discarding subsequently received inputs having a same interaction identification; and
incrementing the interaction identification.

29. The method of claim 21 wherein the synchronizing comprises synchronizing the sub-sessions with a corresponding plurality of sub-clients.

30. A computer-readable storage medium having instructions stored thereon that, when executed by one or more processors, cause the one or more processors to perform procedures comprising:
discovering multimodal capability associated with a first multimodal sub-session in at least one of a plurality of clients;
registering the multimodal capability in a registration server;
initiating a second multimodal sub-session responsive to the discovering the multimodal capability associated with the first multimodal sub-session;
associating the first and second multimodal sub-sessions from the at least one client via, at least in part, a session identifier provided from the at least one client;
integrating the at least one of the plurality of clients with an application server running an application; and
synchronizing the first and second multimodal sub-sessions with other sub-sessions of a multimodal session.

31. The computer-readable storage medium of claim 30 where integrating the at least one client with the application server occurs responsive to the session identifier.

32. The computer-readable storage medium of claim 30
wherein the discovering comprises receiving an HTTP request made by a browser sub-client, the HTTP request being configured to indicate a voice capability, and the HTTP request including the session identifier; and
wherein the associating occurs responsive to the session identifier.

33. The computer-readable storage medium of claim 30
wherein the discovering comprises receiving a VoIP request made by a VoIP sub-client, the VoIP request being configured to indicate an HTTP capability, and the VoIP request including the session identifier; and
wherein the associating occurs responsive to the session identifier.

34. The computer-readable storage medium of claim 30
wherein the discovering comprises receiving a PSTN request made by a PSTN sub-client, the PSTN request being configured to indicate an HTTP capability, and the PSTN request including the session identifier; and
wherein the associating occurs responsive to the session identifier.

35. The computer-readable storage medium of claim 30
wherein the registering includes registering an identification and an address for each multimodal sub-client associated with the identification.

36. The computer-readable storage medium of claim 30 wherein the synchronizing comprises:
associating an input with a corresponding interaction identification;
sending a current interaction identification to each sub-client;
accepting a single input for each interaction identification;
discarding subsequently received inputs having a same interaction identification; and
incrementing the interaction identification after the accepting.

37. The computer-readable storage medium of claim 30 wherein the synchronizing comprises synchronizing multiple coordinated inputs from the plurality of the multimodal sub-sessions.

* * * * *

UNITED STATES PATENT AND TRADEMARK OFFICE
CERTIFICATE OF CORRECTION

PATENT NO. : 7,490,125 B1
APPLICATION NO. : 10/458778
DATED : February 10, 2009
INVENTOR(S) : Ramanathan Jagadeesan It is certified that error appears in the above-identified patent and that said Letters Patent is hereby corrected as shown below:

At column 9, line 29, claim 1, please replace "to synchronize the the first" with --to synchronize the first--.
At column 9, line 51, claim 6, please replace "the registrations server" with --the registration server--.
At column 10, line 64, claim 18, please replace "identification, discards subsequently" with --identification, discard subsequently--.
At column 10, line 66, claim 18, please replace "and increments the interaction" with --and increment the interaction--.

Signed and Sealed this

Twenty-ninth Day of September, 2009

David J. Kappos
*Director of the United States Patent and Trademark Office*